United States Patent
Rainish

(10) Patent No.: US 10,312,997 B2
(45) Date of Patent: Jun. 4, 2019

(54) METHOD FOR REDUCING INTERFERENCE IN A SATELLITE COMMUNICATIONS NETWORK

(71) Applicant: Satixfy Israel Ltd., Rehovot (IL)

(72) Inventor: Doron Rainish, Ramat Gan (IL)

(73) Assignee: SATIXFY ISRAEL LTD., Rehovot (IL)

(*) Notice: Subject to any disclaimer, the term of this patent is extended or adjusted under 35 U.S.C. 154(b) by 79 days.

(21) Appl. No.: 15/311,969

(22) PCT Filed: May 13, 2015

(86) PCT No.: PCT/IL2015/000025
§ 371 (c)(1),
(2) Date: Nov. 17, 2016

(87) PCT Pub. No.: WO2015/177779
PCT Pub. Date: Nov. 26, 2015

(65) Prior Publication Data
US 2017/0104520 A1    Apr. 13, 2017

Related U.S. Application Data

(60) Provisional application No. 62/001,045, filed on May 20, 2014.

(51) Int. Cl.
*H04L 5/00* (2006.01)
*H04B 7/185* (2006.01)
(Continued)

(52) U.S. Cl.
CPC ......... *H04B 7/18513* (2013.01); *H04B 15/00* (2013.01); *H04L 5/0048* (2013.01);
(Continued)

(58) Field of Classification Search
CPC ... H04B 7/18513; H04B 15/00; H04W 52/18; H04W 28/065; H04W 24/02; H04L 5/0048
See application file for complete search history.

(56) References Cited

U.S. PATENT DOCUMENTS 5,481,561 A * 1/1996 Fang .................. H04B 7/216
370/320
5,663,734 A    9/1997 Krasner
(Continued)

FOREIGN PATENT DOCUMENTS

CN    1799208 A    7/2006
CN    101043481    9/2007
(Continued)

OTHER PUBLICATIONS

Fernandez et al., A heuristic Algorithm for the Resource Assignment Problem in Satellite Telecommunication Networks, 20th RCRA International Workshop Conference Proceeding, pp. 1-14 (2013).
(Continued)

*Primary Examiner* — Andrew Lai
*Assistant Examiner* — Chuong M Nguyen
(74) *Attorney, Agent, or Firm* — Browdy and Neimark, P.L.L.C.

(57) ABSTRACT

The present invention provides a method for reducing interference to transmissions, occurring due to other transmissions sent from/to neighboring satellites using same frequencies and/or interference that occur due to other communications transmitted along different satellite's beams using the same frequencies, wherein the method comprises the step of replacing full dummy frames that should be transmitted in a TDM continuous satellite forward channel, by dummy frames' headers with or without a pilot sequence. Also, the dummy frames' headers and the pilot sequence if available, may be transmitted at a reduced power.

7 Claims, 1 Drawing Sheet

DUMMY FRAME

(51) Int. Cl.
*H04B 15/00* (2006.01)
*H04W 24/02* (2009.01)
*H04W 28/06* (2009.01)
*H04W 52/18* (2009.01)

(52) U.S. Cl.
CPC ......... *H04W 24/02* (2013.01); *H04W 28/065* (2013.01); *H04W 52/18* (2013.01); *Y02D 70/00* (2018.01); *Y02D 70/168* (2018.01); *Y02D 70/446* (2018.01)

(56) References Cited

U.S. PATENT DOCUMENTS

| | | | |
|---|---|---|---|
| 6,463,040 | B1 | 10/2002 | Dutta |
| 6,504,855 | B1* | 1/2003 | Matsunaga ........ H04N 21/2365 370/242 |
| 7,035,311 | B2 | 4/2006 | Nohara et al. |
| 8,010,043 | B2 | 8/2011 | Miller |
| 9,143,271 | B2 | 9/2015 | Hong et al. |
| 9,461,701 | B1 | 10/2016 | Mitchener |
| 9,735,940 | B1* | 8/2017 | Bakr .................... H04L 5/0053 |
| 2002/0054632 | A1 | 5/2002 | Chuang et al. |
| 2003/0086512 | A1 | 5/2003 | Rick et al. |
| 2004/0101046 | A1 | 5/2004 | Yang et al. |
| 2004/0114547 | A1* | 6/2004 | Christodoulides .......................... H04B 7/18513 370/316 |
| 2006/0176984 | A1 | 8/2006 | Lee et al. |
| 2007/0085736 | A1 | 4/2007 | Ray et al. |
| 2007/0126612 | A1 | 6/2007 | Miller |
| 2007/0248076 | A1 | 10/2007 | Ji et al. |
| 2009/0023384 | A1 | 1/2009 | Miller |
| 2009/0285151 | A1 | 11/2009 | Eidenschink et al. |
| 2010/0128660 | A1 | 5/2010 | Becker et al. |
| 2011/0032920 | A1 | 2/2011 | Suberviola |
| 2011/0268017 | A1 | 11/2011 | Miller |
| 2012/0207144 | A1 | 8/2012 | Bouvet et al. |
| 2013/0177061 | A1 | 7/2013 | Ram et al. |
| 2013/0331026 | A1 | 12/2013 | O'Neill et al. |
| 2014/0226682 | A1 | 8/2014 | Becker et al. |
| 2014/0369450 | A1 | 12/2014 | Leyh et al. |
| 2016/0182189 | A1 | 6/2016 | Stadali et al. |
| 2017/0104520 | A1 | 4/2017 | Rainish |

FOREIGN PATENT DOCUMENTS

| | | | |
|---|---|---|---|
| CN | 101573891 A | 11/2009 | |
| CN | 101908920 A | 12/2010 | |
| CN | 102461195 | 5/2012 | |
| CN | 103701740 | 4/2014 | |
| WO | 2008100341 A2 | 8/2008 | |
| WO | 2012038380 A1 | 3/2012 | |
| WO | 2013127688 A2 | 9/2013 | |
| WO | WO-2013127688 A2 * | 9/2013 | ........... H04B 1/1027 |
| WO | 2015/177779 | 11/2015 | |

OTHER PUBLICATIONS

Noussi et al., Broadband Satellite Links over Rain-Affected Wide Areas, University of Portsmounth, pp. 1-5 (2004).

IITU-R Recommendation No. P.618 entitled Propagation data and prediction methods required for the design of Earth-space telecommunication systems, pp. 1-26 (2013).

* cited by examiner

FIG.1
PRIOR ART
FIG.2
FIG.3
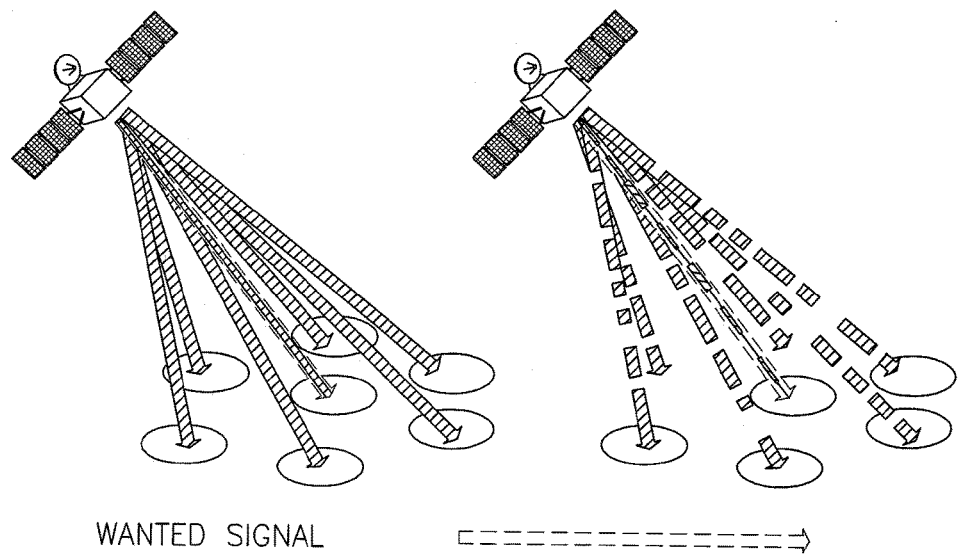
WANTED SIGNAL
WANTED SIGNAL +
INTER BEAM INTERFERENCE
WANTED SIGNAL
WITH REDUCED INTERFERENCE
FIG.4A
PRIOR ART
FIG.4B

METHOD FOR REDUCING INTERFERENCE IN A SATELLITE COMMUNICATIONS NETWORK

FIELD OF THE DISCLOSURE

The present disclosure relates to the field of communications and in particularly to communications being held between satellites and terminals associated therewith in a satellite communications network.

BACKGROUND OF THE DISCLOSURE

Interference occurring due to transmissions sent from/to neighbor satellites, using the same frequencies as well as interference occurring due to communications transmitted along satellites beams using the same frequencies, tend to degrade the reception performance and to limit the maximal channel throughput.

Interference to communications exchanged along satellite links is one of the major factors limiting the capacity of satellite communication. Modern satellites include numerous transponders transmitting at different frequencies, different antennas (single beam or multiple beam), and different polarizations per antenna. Thus, a ground receiver of a satellite link is susceptible to interference that may arise, for example, from co-frequency transmissions at the same frequency, same beam but different polarization (co-frequency, co-beam, cross polarization), same frequency but a different beam (co-frequency, adjacent beam), and adjacent frequency channel from the same or from different beams.

As the satellite uplink receiver is also susceptible to interference, interference on the uplink may leak into the desired channel as well. Additionally, unwanted interference originating from an adjacent satellite may also occur as well as interfering signals from terrestrial sources.

Interference events may be caused by rules violations or errors made by operators. However, the effects of these events might be mitigated due to the newly established Carrier ID standard, which enables a satellite operator or regulators to identify and shut down interfering transmissions. Nevertheless, even links that operate in accordance with the operation rules and regulations may still be a source of interference.

Active interference cancellation means are available. Such means typically involve building a dedicated receiver to capture the interfering signal and then cancel it by subtraction from the wanted signal. Obviously, this technique is rather costly while perfect cancellation is never possible. Even when the interfering signal is known (which is the case when dummy frames are transmitted), cancellation requires synchronization and channel estimation of the interference, which might still require installation of additional circuitry.

A large part of the communication traffic transferred via satellites, is continuous in nature. It includes broadcast transmissions, distribution and contribution links, cellular and Internet connection backhaul traffic etc. The fact that the transmissions are continuous makes it possible to manufacture relatively simple receivers, which are not required to re-acquire and re-synchronize to separate transmission bursts. It also enables the receiver to track the various transmission parameters relatively in a straightforward operation. Hence, satellite communications' standards, such as DVB-S2 and DVB-S2X define a continuous transmission mode of operation in the forward link (transmissions being sent from the satellite(s) towards the terminals), and define that whenever the (hub) transmitter has no data to transmit, "dummy frames" will be transmitted. These dummy frames contain no information, create interference to adjacent beams and satellites, and as a result increase satellite power consumption.

However, not all of the traffic being exchanged, requires the use of strictly continuous links. Interactive communications for example, are bursty by nature, and an assembly of such links forms links of non-constant rate. Depending on the specific statistics of the link, there is always a difference between the allocated bandwidth of a link, which is typically determined by the difference between the peak information rate for transferring the information to the average information rate that can be supported. The dummy frames, used by the DVB-S2 and DVB-S2X standards, are used in order to compensate for this difference.

SUMMARY OF THE DISCLOSURE

Therefore, it is an object of the present invention to provide a method for reducing interference occurring due to transmissions sent from/to neighbor satellites using the same frequencies and/or interference occurring due to communications transmitted along satellites beams using the same frequencies.

It is another object of the present invention to provide a method that relies on peak to average information rate difference, e.g. transmission of dummy frames, for reducing interference to the air interface operation.

Other objects of the present invention will become apparent as the description of the invention proceeds.

According to a first embodiment of the disclosure, a method is provided for reducing interference to transmissions that occur due to other transmissions sent from/to neighboring satellites utilizing the same frequencies and/or interference that occur due to other communications transmitted along different satellites beams using the same frequencies, wherein the method comprises the step of replacing full dummy frames that should be transmitted in a TDM continuous satellite forward channel, with dummy frames' headers.

The term "same frequencies" as used herein throughout the specification and claims is used to denote the exact same frequencies, or frequencies that are sufficiently close to the transmission frequencies, thereby causing interference to the communications transmitted at the transmission frequencies.

According to another embodiment, the method provided further comprising a step of inserting at least one pilot sequence at at least one gap formed when a full dummy frame associated with the dummy frame's header and comprises a respective payload, was replaced by a dummy frame's header.

In accordance with another embodiment, dummy frame's header is transmitted at a reduced power. Also, if at least one pilot sequence has been inserted at the at least one gap formed, it will be transmitted at a reduced power.

By yet another embodiment, the method provided further comprising a step of inserting dummy frames at at least one of the satellite's transmission beams, when there is data available for transmission along that at least one beam.

In accordance with another embodiment of this invention, the timing of the dummy frames is optimized so that the system performance is enhanced (e.g. the system throughput is increased). To this end, in a multi beam system, the transmitting timing of dummy frames, dummy frames headers or dummy frames headers and pilot signals in each beam, is controlled in such a way that the inter-beam interference is minimized (at the cost of some additional delays). That is, dummy frames would be inserted in transmissions conveyed along a beam, even if this beam's queue is not empty, in order to reduce interference to a certain frame or frames being transmitted along another beam or beams. The decision on whether to insert a dummy frame, and thus delaying transmission of a frame, may depend on that frame time sensitivity or other quality of service parameters associated therewith.

According to prior art protocols, dummy frames are transmitted only when there is no data to send. In accordance with another embodiment of the present invention, dummy frames, dummy frame headers or dummy frames headers and pilot signals are inserted at some of the beams (preferably at those that are less occupied with communications), also when there is data to send in order to reduce interference to other beams, at a cost of delaying the data frames.

According to another aspect of the disclosure, there is provided a receiver configured for use in a satellite communications network, wherein the receiver is configured to receive communications wherein full dummy frames that should have been transmitted in a TDM continuous satellite forward channel, were replaced with dummy frames' headers.

In accordance with another embodiment of this aspect of the disclosure, the receiver is further configured to receive communications in which at least one pilot sequence was inserted at at least one gap formed when a full dummy frame associated with that dummy frame's header and comprises a respective payload, had been replaced with the dummy frame's header.

BRIEF DESCRIPTION OF THE DRAWINGS

The present invention will be more fully understood from the following detailed description of the embodiments thereof, taken together with the drawings in which:

FIG. 1—illustrates a prior art transmission sequence of communications in a satellite network;

FIG. 2—demonstrates one embodiment of the solution provided by the present invention whereby only the header of dummy frames are transmitted together with pilot signals, instead of full dummy frame's payload;

FIG. 3—demonstrates another embodiment of the solution provided by the present invention whereby only the header of dummy frames are transmitted instead of the full dummy frames;

FIG. 4A—demonstrates a standard complying system (prior art) where no dummy frames are inserted at any of the beams when there is data to send along these beams; and FIG. 4B—illustrates yet another embodiment of the solution provided by the present invention whereby dummy frames are inserted at some of the beams also at times when there is data to send along these beams.

DETAILED DESCRIPTION OF THE DISCLOSURE

In the following description, for the purposes of explanation, numerous specific details are set forth in order to provide a better understanding of the present invention by way of examples. It should be apparent, however, that the present invention may be practiced without these specific details.

DVB-S2/DVB-S2X Standard (EN 302 307, Part I and Part II)

Dummy frames' insertion is a common practice for all modes of operation of the DVB-S2 and DVB-S2X standard, except for broadcasting with constant coding and modulation (CCM). The standard foresees that inserting dummy frames for obtaining a rate matching between the allocated bandwidth (allocated transmission rate) and the actual transmission rate, is necessary. Dummy frames are inserted when data is not available at the input of the transmitter. A dummy frame is a relatively short frame (having a length of between 3330 to 3510 symbols), which comprises a header of 90 or 180 symbols, and 3240 pre-determined symbols instead of data. It may also include 72 symbols of pilots, which are also known symbols transmitted within each frame to facilitate synchronization and channel estimation. A typical DVB-S2/S2X frame varies in size between 3240 to 33720 symbols, and includes a header, data and pilot symbols. The frame size depends on the type of modulation selected, while the actual symbol rate is determined by the allocated bandwidth for the link.

Calculation of Expected Improvement of Link Performance

According to an embodiment of the present disclosure, dummy frames are transmitted while using a reduced transmission power.

Let us consider now the link associated with the interfering signal. The operational signal to noise plus interference ratio (SINR) of that link, which is required to decode the data, is higher than that required to acquire and decode the header and extract synchronization and channel parameters needed for the receiver. Thus, reducing the transmission power for transmitting a dummy frame, and even reducing the power for transmitting dummy symbols down to zero, would have no adverse effect on the performance of that link. Also, it should be appreciated that avoiding transmission of part of the dummy frame and/or reducing the power at which the dummy frames' headers, the pilot sequence (if available) or both, would require a somewhat different (more complex) receiver for carrying out the present invention than the typical receiver, commonly used nowadays.

Random Links

Let us now consider a case where a link operates in an environment of L interfering links, each associated with an average to peak information rate of $\rho_l(\rho \le 1), \ldots, L$. Assuming that all links transmit continuously. The SINR experienced by a link is given by:

$$SINR = \frac{S}{N + \sum_{l=1}^{L} I_l}$$

Where S is the received signal power, N is the noise power and $I_l$ is the interference power received from the $l^{th}$ interfering link. The received signal power, S, is in fact a random variable since the channel may undergo fading, so $SINR_0$,—the operational SINR, is determined by its statistics, which is measured or taken from ITU-R Recommendation No. P.618 entitled "Propagation data and prediction methods required for the design of Earth-space telecommunication systems", September 2013.

Now, let us consider a case where power reduction for transmitting dummy frames is implemented. In such a case, a fraction $\rho_l$ of the time, link 1 will be transmitting in full power and cause interference of $I_l$ to the link of interest, while for $1-\rho_l$ of the time it will transmit with reduced power and the interference caused thereby will be reduced to $\alpha I_l, \alpha < 1$. In other words, the power of interference caused by such a link, may be described as multiplied by a stochastic variable with binomial distribution.

$$\tilde{I}_l = X_l I_l$$

$$Pr(X_l = x) = \begin{cases} \rho_l & x = 1 \\ 1 - \rho_l & x = \alpha \end{cases}$$

The total interference is thus given by:

$$\sum_{i=1}^{L} \tilde{I}_i = \sum_{i=1}^{L} X_i I_i < \sum_{i=1}^{L} I_i$$

The total interference is a random variable. Its exact statistics may depend on a number of parameters such as the number of interfering signals, their relative strength, the different average to peak ratio per link, and whether they are correlated (namely, if there is a correlation among dummy frames transmission times). However, similarly to the approach taken while considering the signal fluctuations, one can measure or estimate the margin required, when considering also the fact that the interference is reduced.

Controlled Links

In case where all links are controlled by a central entity, (e.g. a scheduler), the stochastic process described hereinabove may be made more deterministic, and in this case, some maximal interference level may be ensured with high probability. For that purpose, the scheduler will transmit dummy frames (reduced power, header and pilots only) instead of frames which, according to their QoS requirement, can be delayed.

FIG. 1 illustrates a prior art transmission sequence of communications in a satellite network, where full dummy frames are transmitted between communication frames, when data is not available at the ingress of the transmitter. The purpose of inserting these dummy frames is to achieve a rate matching between the allocated bandwidth for transmission and the actual transmission rate.

FIG. 2 illustrates a non-limiting example of a transmission method construed in accordance with the present invention, whereby only the header of dummy frames are transmitted together with pilot signals instead of the full dummy frame's payload. In the example illustrated in this FIG. 2, two pilot signals are inserted during the interval at which the dummy frame's payload would have been transmitted if the prior art protocol illustrated in FIG. 1, were to be followed).

FIG. 3 demonstrates another embodiment of the solution provided by the present invention whereby only the header of dummy frames are transmitted, instead of the full dummy frames.

FIG. 4B illustrates yet another embodiment of the solution provided by the present invention whereby dummy frames are inserted at some of the beams also at times when there is data to send along these beams, as opposed to a standard complying system illustrated at FIG. 4A, wherein no dummy frames are inserted at any of the beams at times when there is data to send along these beams.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments of the present invention that are described and embodiments of the present invention comprising different combinations of features noted in the described embodiments will occur to persons of the art. The scope of the invention is limited only by the following claims.

The invention claimed is:

1. A method for reducing interference to transmissions, occurring due to other transmissions sent from/to neighboring satellites using same frequencies and/or interference that occur due to other communications transmitted along different satellite's beams using the same frequencies, wherein said method comprises transmission of at least one dummy frame's header in replacement of at least one full dummy frame that should have been transmitted in a TDM continuous satellite forward channel, such that at least one gap is formed when said at least one full dummy frame, which is associated with a respective dummy frame's header and comprises a respective payload, is replaced by said at least one dummy frame's header, wherein the total length of said at least one dummy frame's header and said at least one gap is the same as the length of the at least one full dummy frame.

2. The method according to claim 1, further comprising a step of inserting at least one pilot sequence at said at least one gap.

3. The method according to claim 1, wherein said at least one dummy frame's header is transmitted at a reduced power.

4. The method according to claim 2, wherein said at least one pilot sequence is transmitted at a reduced power.

5. The method according to claim 1, further comprising a step of inserting dummy frames at the at least one of the satellite's transmission beams, when there is data available for transmission along that at least one satellite's transmission beam.

6. A receiver configured for use in a satellite communications network, wherein said receiver is operative to receive communications wherein at least one full dummy frame that should have been transmitted in a TDM continuous satellite forward channel was replaced with at least one dummy frame's header such that at least one gap is formed when said at least one full dummy frame, which is associated with a respective dummy frame's header and comprises a respective payload, is replaced by said at least one dummy frame's header, wherein the total length of said at least one full dummy frame's header and said at least one gap is the same as the length of said at least one full dummy frame.

7. The receiver according to claim 6, wherein said receiver is further configured to receive communications in which at least one pilot sequence was inserted at said at least one gap.

* * * * *